(12) United States Patent
Mn et al.

(10) Patent No.: US 9,442,490 B2
(45) Date of Patent: Sep. 13, 2016

(54) SYSTEM AND METHOD FOR AIRCRAFT PERFORMANCE PREDICTIONS FOR DESCENT AND APPROACH PHASES

(75) Inventors: Veeresh Kumar Mn, Bangalore (IN); Dinesh Kumar Kushwaha, Bangalore (IN); Chaitanya Pavan Kumar, Bangalore (IN)

(73) Assignee: AIRBUS ENGINEERING CENTRE INDIA, Bangalore, Karnataka (IN)

( * ) Notice: Subject to any disclaimer, the term of this patent is extended or adjusted under 35 U.S.C. 154(b) by 0 days.

(21) Appl. No.: 13/452,967

(22) Filed: Apr. 23, 2012

(65) Prior Publication Data

US 2012/0277936 A1    Nov. 1, 2012

(30) Foreign Application Priority Data

Apr. 29, 2011    (IN) .......................... 1478/CHE/2011

(51) Int. Cl.
*G05D 1/06*    (2006.01)

(52) U.S. Cl.
CPC .................................. *G05D 1/0676* (2013.01)

(58) Field of Classification Search
CPC .................................................. G05D 1/0676
USPC ........... 340/963, 945, 946, 969, 970; 701/16
See application file for complete search history.

(56) References Cited

U.S. PATENT DOCUMENTS

| | | | | |
|---|---|---|---|---|
| 4,667,196 A * | 5/1987 | Kaul | ...................... | G01S 13/787 340/948 |
| 4,825,374 A | 4/1989 | King et al. | | |
| 5,053,767 A * | 10/1991 | Zweifel | ................ | G05D 1/0615 244/191 |
| 5,079,711 A * | 1/1992 | Lambregts | ........... | G05D 1/0638 244/181 |
| 5,892,462 A * | 4/1999 | Tran | ....................... | G01C 5/005 340/961 |
| 6,134,500 A * | 10/2000 | Tang | .................... | G05D 1/0005 701/10 |
| 6,266,610 B1 * | 7/2001 | Schultz | .................. | G05D 1/101 701/528 |
| 7,075,457 B1 * | 7/2006 | Chidester | ............... | G08G 5/025 340/945 |
| 7,161,501 B1 * | 1/2007 | Lynch | .................... | G08G 5/025 340/945 |
| 7,212,135 B1 * | 5/2007 | Lynch | ................... | G08G 5/0065 244/183 |
| 7,561,946 B1 * | 7/2009 | Schipper | .............. | G05D 1/0653 701/14 |
| 8,050,780 B2 * | 11/2011 | Tessier | .................... | B64C 13/04 244/229 |
| 8,184,020 B2 * | 5/2012 | He | ........................ | G01C 23/005 340/973 |
| 8,217,807 B1 * | 7/2012 | Carrico | ................ | G08G 5/0021 340/945 |
| 8,275,498 B2 * | 9/2012 | Alfano | .................... | F42B 15/01 114/259 |

(Continued)

FOREIGN PATENT DOCUMENTS

| | | | |
|---|---|---|---|
| EP | 2224305 A1 * | 9/2010 | |
| EP | 2328053 A1 * | 6/2011 | |
| GB | 2426749 A * | 12/2006 | |

*Primary Examiner* — Jean-Paul Cass
(74) *Attorney, Agent, or Firm* — Prakash Nama; Global IP Services, PLLC

(57) ABSTRACT

A system and method for aircraft performance predictions for descent and approach phases are disclosed. In one embodiment, cruise computation is stopped substantially around a default distance from a destination. Further, current predicted aircraft state is determined using a total energy of the aircraft starting from the default distance. Furthermore, descent and approach phase profiles are computed using the determined current predicted aircraft state. In addition, the aircraft performance predictions are obtained using the computed descent and approach phase profiles.

11 Claims, 6 Drawing Sheets

(56) References Cited

U.S. PATENT DOCUMENTS

| | | | | |
|---|---|---|---|---|
| 8,290,639 B2* | 10/2012 | Westphal | B64C 13/16 244/75.1 |
| 8,352,104 B2* | 1/2013 | Wachenheim | G05B 19/416 244/180 |
| 8,392,037 B2* | 3/2013 | Sahasrabudhe | G05D 1/0676 244/17.13 |
| 8,468,244 B2* | 6/2013 | Redlich | G06Q 10/06 705/50 |
| 8,538,673 B2* | 9/2013 | Sislak | G06Q 10/047 701/301 |
| 2006/0200279 A1* | 9/2006 | Ainsworth | G08G 5/025 701/16 |
| 2006/0253232 A1* | 11/2006 | Gerrity | G08G 5/025 701/16 |
| 2007/0064016 A1* | 3/2007 | Hillerin | G06F 17/5018 345/647 |
| 2008/0262665 A1* | 10/2008 | Coulmeau | G08G 5/0039 701/16 |
| 2009/0112535 A1* | 4/2009 | Phillips | G06Q 10/04 703/2 |
| 2009/0254572 A1* | 10/2009 | Redlich | G06Q 10/06 |
| 2010/0036552 A1* | 2/2010 | Pepitone | G05D 1/0676 701/18 |
| 2010/0114633 A1* | 5/2010 | Sislak | G06Q 10/047 701/120 |
| 2010/0250497 A1* | 9/2010 | Redlich | F41H 13/00 707/661 |
| 2011/0018740 A1* | 1/2011 | Boren | G08B 6/00 340/965 |
| 2011/0060215 A1* | 3/2011 | Tupin, Jr. | A61B 5/0507 600/425 |
| 2012/0013478 A1* | 1/2012 | Alfano | F42B 15/01 340/815.4 |
| 2012/0016541 A1* | 1/2012 | Alfano | B64G 1/242 701/13 |
| 2012/0277936 A1* | 11/2012 | Mn | G05D 1/0676 701/16 |
| 2013/0085672 A1* | 4/2013 | Stewart | G08G 5/003 701/528 |

* cited by examiner

SYSTEM AND METHOD FOR AIRCRAFT PERFORMANCE PREDICTIONS FOR DESCENT AND APPROACH PHASES

RELATED APPLICATIONS

Benefit is claimed under 35 U.S.C. 119(a)-(d) to Foreign application Serial No. 1478/CHE/2011 filed in INDIA entitled "SYSTEM AND METHOD FOR AIRCRAFT PERFORMANCE PREDICTIONS FOR DESCENT AND APPROACH PHASES" by AIRBUS ENGINEERING CENTRE INDIA, filed on Apr. 29, 2011, which is herein incorporated in its entirety by reference for all purposes.

FIELD OF TECHNOLOGY

Embodiments of the present subject matter relate to flight management systems. More particularly, embodiments of the present subject matter relate to aircraft performance predictions for descent and approach phases.

BACKGROUND

Modern aircrafts generally include an onboard computing system called flight management system (FMS). The FMS provides the flight crew with information on the future states of the aircraft along a selected flight path. This information includes predictions based on the performance of the aircraft during various phases of the flight. Typically, the flight plan includes a descent phase, which normally starts from the end of cruise (also referred to as top-of-descent distance) and is considered to be completed once the aircraft reaches a runway threshold through an approach phase, which is mainly performed at idle thrust. Predictions of time, fuel consumption, flying altitude, aircraft speed and other parameters at en route points until the runway threshold provide useful information about the future performance of the aircraft. Typically, such predictions are displayed to the flight crew and used in the guidance of the aircraft along the vertical trajectory.

Currently, the criteria used for obtaining the information are preset or the parameter values may be assumed in obtaining the information. For example, climb angle, fuel flow and true air speed (TAS) may be considered to vary linearly with the altitude. Further, constant values may be considered for parameters, such as air speed, lapse rate, temperature and the like to obtain the information. This can result in providing inaccurate information to the flight crew during the descent phase.

SUMMARY

A system and method for aircraft performance predictions for descent and approach phases are disclosed. According to one aspect of the present subject matter, a method of aircraft performance predictions for descent and approach phases in a flight management system (FMS) includes stopping cruise computation substantially around a default distance from a destination. Further, current predicted aircraft state is determined using a total energy of the aircraft starting from the default distance. Furthermore, descent and approach phase profiles are computed using the determined current predicted aircraft state. In addition, the aircraft performance predictions are obtained using the computed descent and approach phase profiles.

According to another aspect of the present subject matter, a non-transitory computer-readable storage medium for the aircraft performance predictions for the descent and approach phases, having instructions that, when executed by a computing device causes the computing device to perform the method described above.

According to yet another aspect of the present subject matter, the aircraft includes the FMS. Further, the FMS includes a processor and memory coupled to the processor. Furthermore, the memory includes an aircraft performance predictions module. In one embodiment, the aircraft performance predictions module includes instructions to stop cruise computation substantially around the default distance from the destination. Moreover, the aircraft performance predictions module determines the current predicted aircraft state using the total energy of the aircraft starting from the default distance. In addition, the aircraft performance predictions module computes the descent and approach phase profiles using the determined current predicted aircraft state. Also, the aircraft performance predictions module obtains the aircraft performance predictions using the computed descent and approach phase profiles.

The methods and systems disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for aircraft performance predictions for descent and approach phases are disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
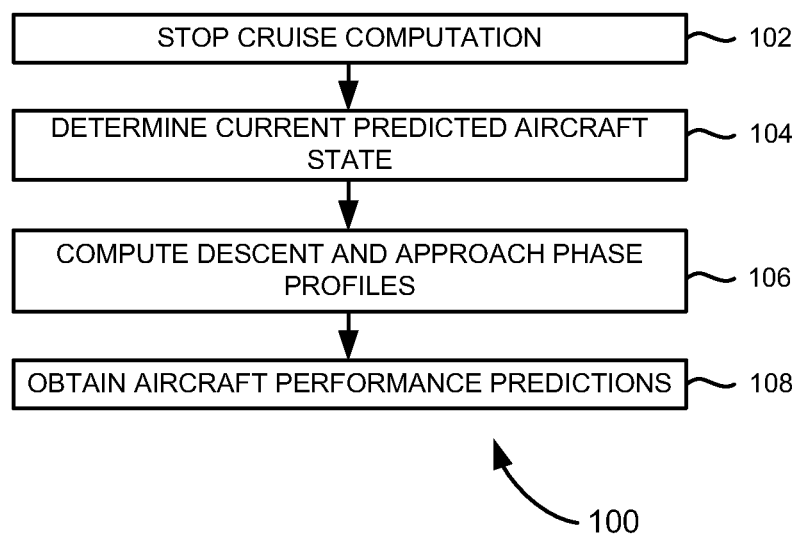
FIG. 1 illustrates a flow diagram of an exemplary method of aircraft performance predictions for descent and approach phases in a flight management system (FMS), according to one embodiment.

FIG. 1 illustrates a flow diagram 100 of an exemplary method of aircraft performance predictions for descent and approach phases in a flight management system (FMS), according to one embodiment. At block 102, cruise computation carried out by the FMS is stopped substantially around a default distance from a destination. At block 104, current predicted aircraft state is determined using a total energy of the aircraft starting from the default distance. Exemplary current predicted aircraft state includes flight parameters, such as aircraft gross weight, flying altitude, distance covered by the aircraft, aircraft speed and the like.

At block 106, descent and approach phase profiles are computed using the determined current predicted aircraft state. This is explained in more detail with reference to FIG. 5. In one embodiment, the descent and approach phase profiles are computed by selecting a starting top-of-descent distance from the destination while the aircraft is in cruise altitude. Further, an iterative backward computation is performed from the destination to the cruise altitude to obtain the descent and approach phase profiles using the determined current predicted aircraft state. This is explained in more detail with reference to FIGS. 3, 4 and 5.

At block 108, the aircraft performance predictions are obtained using the computed descent and approach phase profiles. In one embodiment, a first top-of-descent distance is obtained from the obtained descent and approach phase profiles. Further, it is determined whether a difference between the starting top-of-descent distance and the first top-of-descent distance is within a design value. If the difference between the starting top-of-descent distance and the first top-of-descent distance is within the design value, the aircraft performance predictions are determined, using the obtained descent and approach phase profiles, in a forward computation. Furthermore, the aircraft performance predictions are determined for each way point using the descent and approach phase profiles in the forward computation.

Also in this embodiment, if the difference between the starting top-of-descent distance and the first top-of-descent distance is not within the design value, the obtained first top-of-descent distance is considered as the starting top-of-descent distance. Further, the steps of obtaining the first top-of-descent distance from the obtained descent and approach phase profiles and determining whether the difference between the starting top-of-descent distance and the obtained first top-of-descent distance is within the design value are repeated until the difference is within the design value. This is explained in more detail with reference to FIG. 3.

Figure 2:
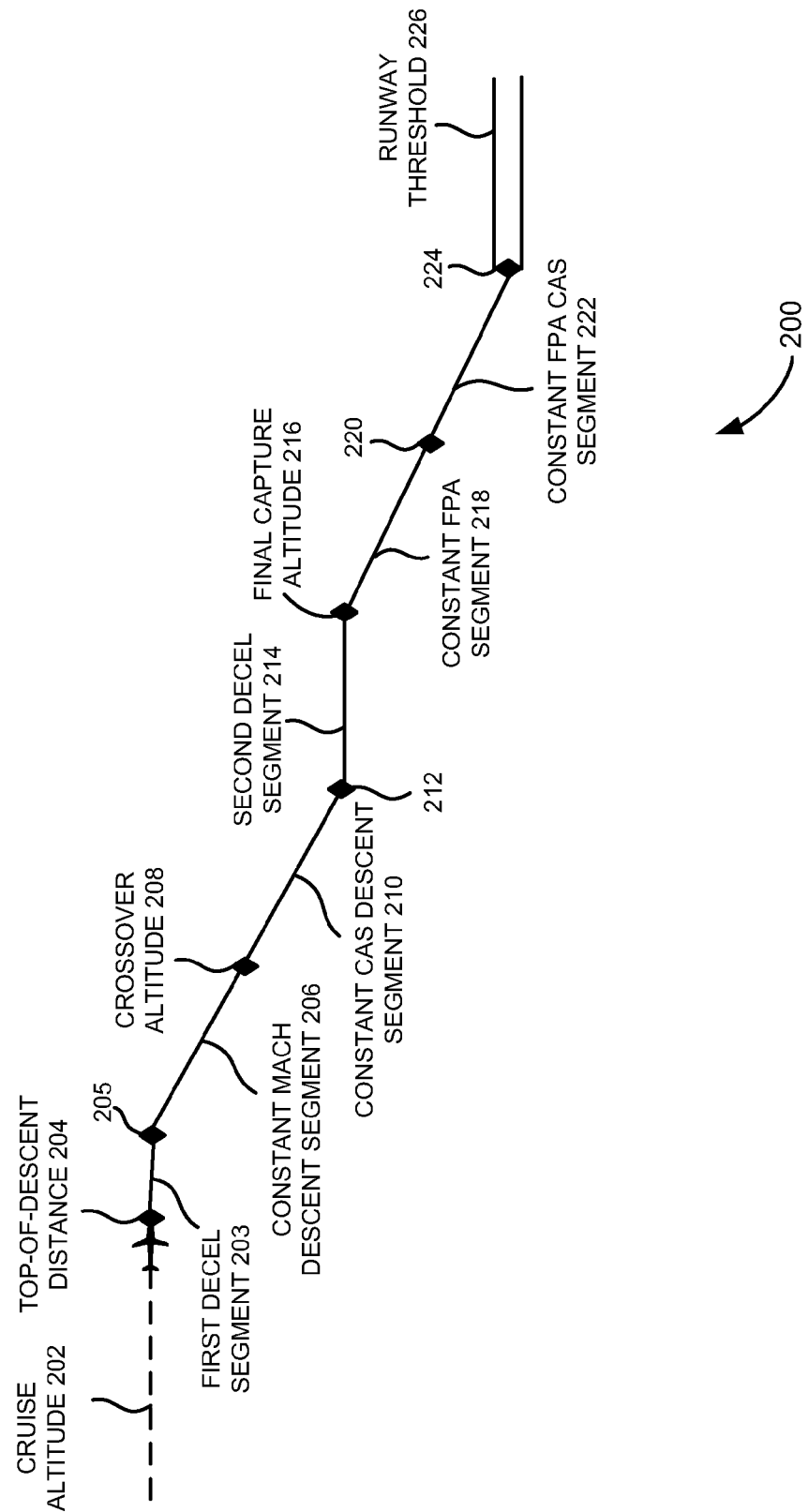
FIG. 2 illustrates descent and approach phase profiles computed in a backward sense, according to one embodiment.

Referring now to FIG. 2, which illustrates the descent and approach phase profiles computed in a backward sense, according to one embodiment. Generally, a descending flight includes a descent phase and an approach phase. Normally, the descent phase starts from the top-of-descent distance 204 and is considered to be completed at point 212, as shown in FIG. 2. The descent phase further includes a crossover altitude 208 and a constant calibrated air speed (CAS) descent segment 210, as shown in FIG. 2. In addition, the descent phase includes a first deceleration (decel) segment 203 if there is a difference between a descent speed and a cruise speed. The descent speed is the speed of the aircraft in the descent phase and the cruise speed is the speed of the aircraft in the cruise altitude 202. Also, the descent phase includes a constant MACH descent segment 206 if the cruise altitude 202 is greater than the crossover altitude 208.

Typically, the approach phase starts from the point 212, shown in FIG. 2 and is considered to be completed at point 224, shown in FIG. 2. The approach phase further includes a second decel segment 214, a final capture altitude 216, a constant flight path angle (FPA) segment 218 and a constant FPA CAS segment 222, as shown in FIG. 2. Furthermore as shown in FIG. 2, the flight plan includes a runway threshold 226. The runway threshold 226 is the destination of the flight plan.

As shown in FIG. 2, the cruise altitude 202 is the altitude at which the aircraft is maintained while cruising. Generally, the aircraft starts to descend at the top-of-descent distance 204, shown in FIG. 2. The top-of-descent distance 204 is a critical point at which the aircraft makes a transition from the cruise altitude 202 to the descent phase.

In this embodiment, the descent and approach phase profiles, shown in FIG. 2, are computed using the iterative backward computation performed from the runway threshold 226 till the cruise altitude 202. The computation of the approach phase starts from the point 224. Initially, the constant FPA CAS segment 222 is computed from point 224 till approximately about 1000 ft from a ground level, say point 220, as shown in FIG. 2. Further, the constant FPA segment 218 is computed from the point 220 till the final capture altitude 216 is reached. Furthermore, the second decel segment 214 is computed from the final capture altitude 216 till a descent CAS is reached, say point 212, as shown in FIG. 2. The descent CAS is a value obtained from a performance database.

In addition in this embodiment, the computation of the descent phase starts from the point 212, shown in FIG. 2. In the descent phase, the constant CAS descent segment 210 is computed from point 212 till the crossover altitude 208 is reached. Further, the constant MACH descent segment 206 is computed from the crossover altitude 208 based on the difference between the cruise altitude 202 and the crossover altitude 208. If the cruise altitude 202 is greater than the crossover altitude 208, the constant MACH descent segment 206 is computed till point 205, as shown in FIG. 2. If the cruise altitude 202 is not greater than the crossover altitude 208 the constant MACH descent segment 206 is not computed. Moreover, at point 205, the first decel segment 203 is computed based on the difference between the descent speed and the cruise speed. If there is a difference between the descent speed and the cruise speed, the first decel segment 203 is computed till the cruise speed is reached at the cruise altitude 202. If there is no difference between the descent speed and the cruise speed, at point 205, the first decel segment 203 is not computed. Further, the point at which the descent phase intercepts the cruise altitude 202 is the top-of-descent distance 204.

Also in this embodiment, the descent and approach phase profiles are computed using the current predicted aircraft state using the total energy of the aircraft. This is explained in more detail with reference to FIG. 5. Further, the aircraft performance predictions are determined for each way point using the computed descent and approach phase profiles, in the forward computation. The computations of the aircraft performance predictions are also explained in detail with reference to FIG. 5. The aircraft performance predictions thus obtained is provided to the flight crew for guidance during the descent and approach phases.

Figure 3:
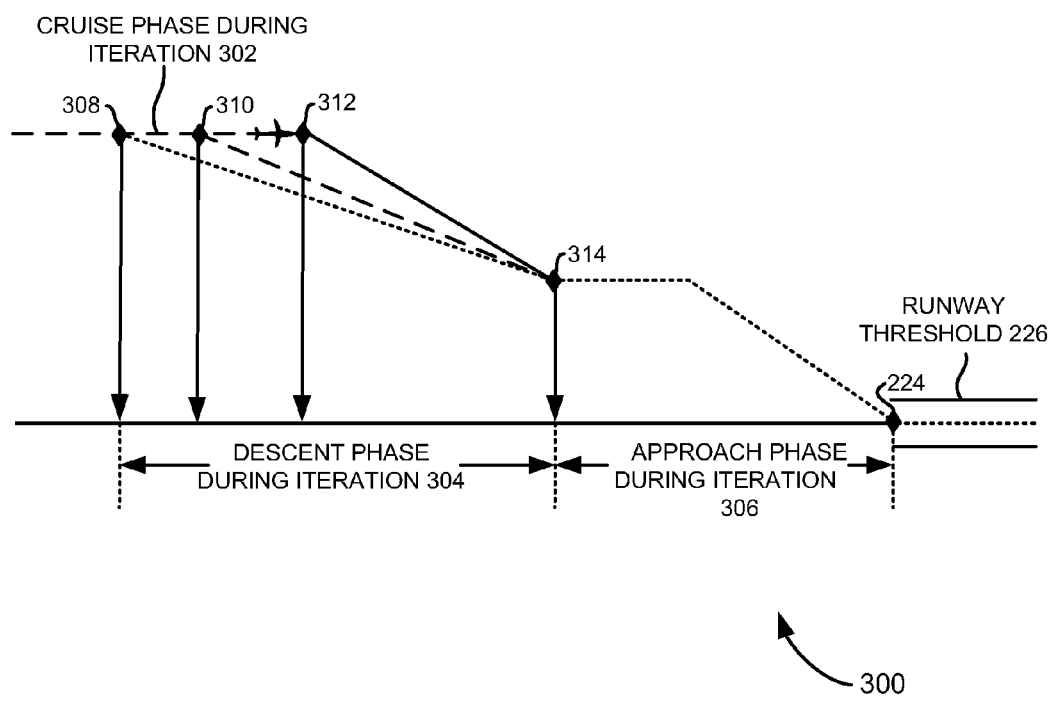
FIG. 3 illustrates a process of computing a top-of-descent distance in an iterative backward computation, according to one embodiment.

Referring now to FIG. 3, a process of computing a top-of-descent distance in the iterative backward computation is illustrated, according to one embodiment. Particularly, FIG. 3 illustrates the possible flight paths obtained during the iterative backward computation. As shown, FIG. 3 includes cruise phase during iteration 302, descent phase during iteration 304 and approach phase during iteration 306.

In an exemplary first iteration, the starting top-of-descent distance, point 308, as shown in FIG. 3, is selected while the aircraft is in the cruise altitude 202, shown in FIG. 2. Further, the iterative backward computation is performed from the point 224 to obtain the descent and approach phase profiles, shown in FIG. 2. This is explained in more detail with reference to FIG. 5. Further, the first top-of-descent distance, point 310 as shown in FIG. 3, is determined from the obtained descent and approach phase profiles. Furthermore, the difference between the starting top-of-descent distance 308 and the first top-of-descent distance 310 is computed. In addition, it is determined whether the difference between the starting top-of-descent distance 308 and the first top-of-descent distance 310 is within the design value. The design value is a threshold value based on the difference between the starting top-of-descent distance 308 and the first top-of-descent distance 310.

Further in this embodiment, if the difference between the starting top-of-descent distance 308 and the first top-of-descent distance 310 is within the design value, the aircraft performance predictions are determined using the obtained descent and approach phase profiles associated with the first top-of-descent distance 310. Furthermore, if the difference between the starting top-of-descent distance 308 and the first top-of-descent distance 310 is not within the design value, the iteration is repeated.

In an exemplary second iteration, the first top-of-descent distance 310, obtained from the first iteration, is considered as the starting top-of-descent distance. Further, the backward computation is repeated to obtain another first top-of-descent distance, say point 312, as shown in FIG. 3. Furthermore, it is determined whether the difference between the starting top-of-descent distance 310 and the first top-of-descent distance 312 is within the design value. Similarly, the steps of obtaining a first top-of-descent distance and determining the difference between the starting top-of-descent distance and the first top-of-descent distance are repeated until the difference is within the design value. The top-of-descent distance thus obtained and the descent and approach phase profiles associated with the obtained top-of-descent distance are used to determine the aircraft performance predictions. The computations for the descent and approach phase profiles in each of the iteration are explained in detail in with reference to FIG. 5.

Figure 4:
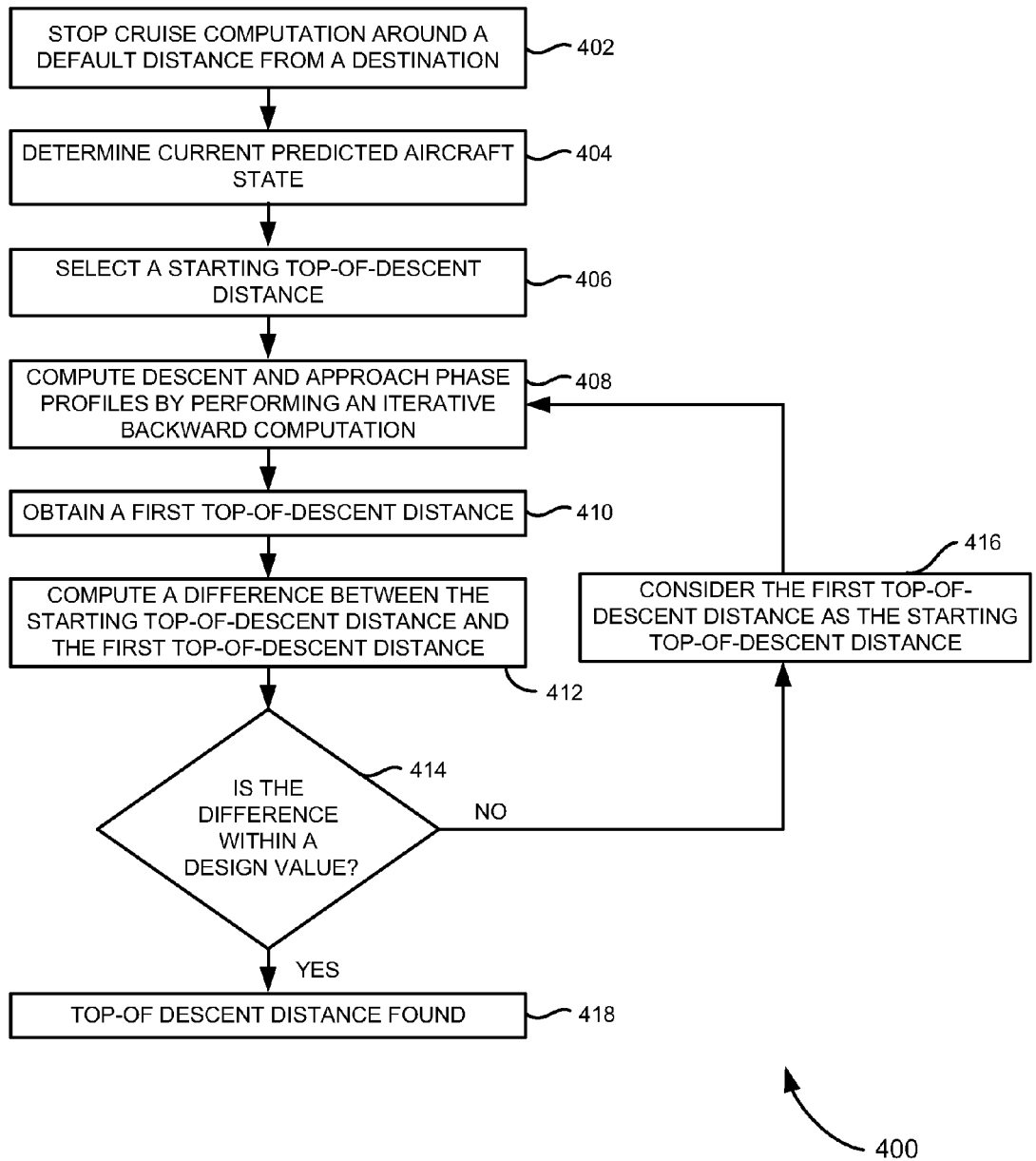
FIG. 4 illustrates a flow diagram of an exemplary method of iteratively computing the top-of-descent distance, such as those shown in FIG. 3, according to one embodiment.

Referring now to FIG. 4, a flow diagram 400 of an exemplary method of iteratively computing the top-of-descent distance, such as those shown in FIG. 3, is illustrated, according to an embodiment. At block 402, the cruise computation carried out by the FMS is stopped substantially around the default distance from the destination. At block 404, the current predicted aircraft state is determined using the total energy of the aircraft starting from the default distance.

At block 406, the starting top-of-descent distance is selected while the aircraft is in the cruise altitude. At block 408, the descent and approach phase profiles are computed from the destination by performing the iterative backward computation. This is explained in more detail with reference to FIG. 5. Using the obtained descent and approach phase profiles, the first top-of-descent distance is obtained at step 410. Further, at step 412, a difference between the starting top-of-descent distance and the first top-of-descent distance is computed.

Figure 5:
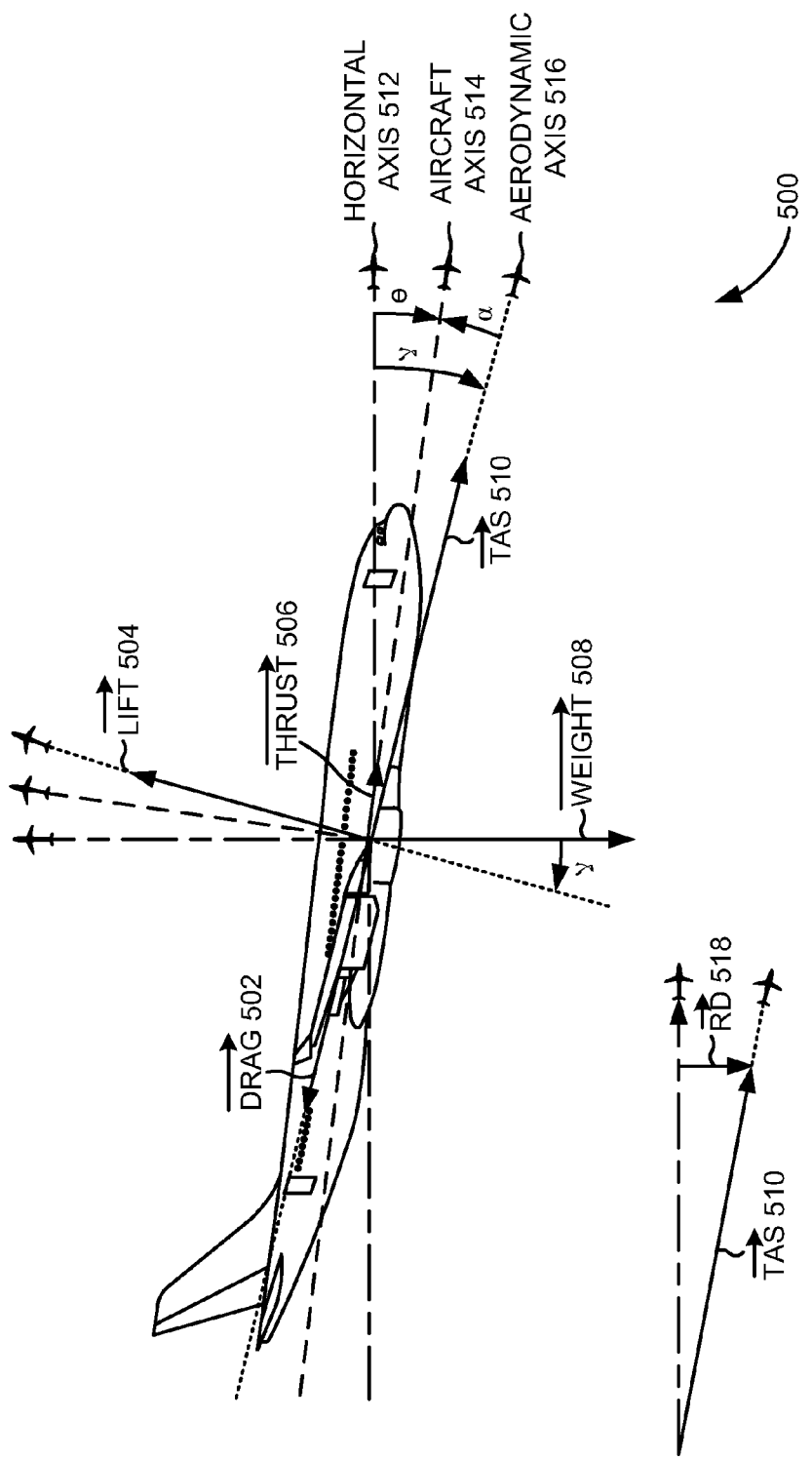
FIG. 5 illustrates exemplary balance of forces experienced by an aircraft during descent.

At block 414, a check is made to determine whether the computed difference is within the design value. If the difference is not within the design value, at block 416, the obtained first top-of-descent distance is considered as the starting top-of-descent distance. Furthermore, the process flow 400 performs the steps in block 408. If the difference is within the design value, at block 418, the obtained first top-of-descent distance is considered as the top-of-descent distance for the flight plan Referring now to FIG. 5, an exemplary balance of forces experienced by an aircraft 500 during descent is illustrated. As shown in FIG. 5, various forces are acting on the aircraft 500 during the descent and approach phases. Particularly, FIG. 5 illustrates determining the current predicted aircraft state using the total energy of the aircraft. Further, based on the forces acting on the aircraft 500 and the current predicted aircraft state, the descent and approach phase profiles, shown in FIGS. 2 and 3, are computed.

Generally, the total energy gained by the aircraft 500 when excess force is acting on the aircraft 500 is expressed using equation:

$$\Delta E_{TOTAL} = \Delta E_{PE} + \Delta E_{KE} \quad (1)$$

wherein,
$\Delta E_{TOTAL}$ is a total energy gained by the aircraft 500;
$\Delta E_{PE}$ is a potential energy gained by the aircraft 500; and
$\Delta E_{KE}$ is a kinetic energy gained by the aircraft 500.

The excess force available in the aircraft 500 is expressed using equation:

$$f_{excess} x = mgh + \tfrac{1}{2} m v^2 \quad (2)$$

wherein,
$f_{excess}$ is an excess force available in the aircraft 500;
x is a distance covered by the aircraft 500;
m is a mass of the aircraft 500;
g is acceleration due to gravity;
h is altitude of the aircraft 500; and
v is a true air speed (TAS) 510, shown in FIG. 5, of the aircraft 500.

Further, differentiating the equation (2) results in the following equation:

$$f_{excess} dx/dt = mg(dh/dt) + \tfrac{1}{2} m(dv^2/dt) \quad (3)$$

Applying, $dv^2 = 2vdv$ and dividing both sides of equation (3) by the term 'm', we obtain the following equation:

$$f_{excess} v/m = g(dh/dt) + v(dv/dt) \quad (4)$$

wherein,
dh/dt is a rate of climb/descent of the aircraft 500; and
dv/dt is an acceleration of the aircraft 500.

Typically, force is a combination of a thrust 506, shown in FIG. 5, provided by the engine of the aircraft 500 and a drag 502, shown in FIG. 5, experienced by the aircraft 500. Therefore, excess specific energy in the aircraft 500 can be expressed using the following equation:

$$\text{excess specific energy} = (\text{thrust} - \text{drag}) * TAS/m \quad (5)$$

In the equation (5), $$(\text{thrust} - \text{drag}) = f_{excess} \quad (6)$$

As shown in FIG. 5, the thrust 506 is the force assumed to be acting on the aircraft 500 along the aircraft axis 514. Further, the thrust 506 is obtained from the performance database based on the current predicted aircraft state which includes parameters, such as aircraft gross weight, flying altitude and the aircraft speed. Also as shown in FIG. 5, the drag 502 is the force acting on the aircraft 500 along the aerodynamic axis 516. Further, the drag 502 is obtained using equation:

$$\text{drag}=\tfrac{1}{2}\rho S(\text{TAS})^2 C_D \qquad (7)$$

wherein, $\rho$ is a density of air;

S is a surface area of the wing of the aircraft 500; and $C_D$ is a drag coefficient.

In this embodiment, the equation (4) defined above is used for computing the descent and approach phase profiles as explained below. The steps involved in computing the approach phase includes computation in the constant FPA CAS segment 222, the constant FPA segment 218 and the second decel segment 214 shown in FIG. 2. The computation in the constant FPA CAS segment 222 includes computing dh/dt and fuel flow. In this embodiment, dh/dt corresponds to the vertical component of the TAS 510 and is obtained using equation:

$$dh/dt = \text{TAS} * \sin \gamma \approx v * \gamma \qquad (8)$$

wherein, $\gamma$, as shown in FIG. 5, is the angle between the horizontal axis 512 and the aerodynamic axis 516. In this scenario, $\gamma$ is normally a very small value.

Further, a change in TAS (dv) is obtained using equation:

$$dv = \text{TAS}_n - \text{TAS}_{n-1} \qquad (9)$$

wherein, n is a time step (e.g., n=0, 1, 2 . . . ).

Furthermore, the fuel flow is obtained by computing the thrust 506 for the constant FPA CAS segment 222. Using the equation (4), thrust 506 can be derived using equation:

$$\text{drag} - \text{thrust} = mg(dh/dt)/v + m(dv/dt)$$

The thrust 506 is computed in the constant FPA CAS segment 222 and in all other segments, such as the constant FPA segment 218, the decel segment 214, the constant CAS descent segment 210 and the constant MACH descent segment 206 the thrust 506 remains idle.

Since $dh/dt = v*\gamma$, we can obtain thrust 506 using equation:

$$\text{thrust} = \text{drag} - (mg\gamma + m(dv/dt))$$

In addition, drag 502 is computed using the equation (7).

The computation in the constant FPA segment 218, shown in FIG. 2, includes computing dv/dt and dh/dt. dv/dt, which can be derived from the equation (4) as shown below:

$$dv/dt = 1/v * (f_{excess} v/m - g(dh/dt))$$

Further, dh/dt can be obtained using the equation (8).

The computation in the second decel segment 214, shown in FIG. 2, includes computing dv/dt. Using the equation (4), dv/dt is derived as shown below:

$$(dv/dt) = f_{excess}/m$$

The rate of climb for the second decel segment 214 is equal to zero, which is expressed as:

$$dh/dt = 0$$

Further in this embodiment, the computation in the descent phase includes the computations in the constant CAS descent segment 210 and the constant MACH descent segment 206. Generally, in the descent phase, dv/dt is a small value and the CAS/MACH of the aircraft 500 is held constant. The steps involved in computing the descent phase are explained below.

In an exemplary first step, the speed change (dv/dt) is computed by subtracting the previous time step TAS 510 from the current time step TAS 510. Using the equation (9), dv can be derived as shown below:

$$dv = \text{TAS}_n - \text{TAS}_{n-1}$$

wherein, n is a time step (e.g., n=0, 1, 2 . . . ).

Further in an exemplary second step, the kinetic energy (KE) change (vdv/dt) required is computed. In the constant CAS descent segment 210 and the constant MACH descent segment 206 the MACH of the aircraft 500 is held constant. However, for a given CAS or MACH the TAS 510, shown in FIG. 5, is a function of the altitude of the aircraft 500. The relation between the TAS 510 and the CAS can be expressed using the equation:

$$\text{TAS} = \sqrt{(\rho_0/\rho)} * K_a * \text{CAS}$$

wherein, $\rho_0$ is an air density at mean sea level;

$\rho$ is an air density at the given altitude; and $K_a$ is a compressibility correction.

Since the TAS 510 of the aircraft 500 increases with the altitude of the aircraft 500, some portion of the total energy ($\Delta$ETOTAL) is used to maintain the required speed. Therefore, a portion of the $\Delta$ETOTAL is converted to KE. The KE is represented using equation:

$$\text{KE} = vdv/dt$$

Furthermore in an exemplary third step, the remaining energy which is used for potential energy (PE) change is computed by subtracting the value of KE required, obtained in the second step, from $f_{excess}$ v/m obtained using equation (4). Therefore, the energy available for PE change is expressed using equation:

$$\text{PE change} = f_{excess} v/m - v(dv/dt)$$

In addition in an exemplary fourth step, the rate of climb (dh/dt) is computed using equation:

$$dh/dt = (f_{excess} v/m - v(dv/dt))/g$$

Using the above described computations the descent and approach phase profiles for the aircraft 500 are obtained. Further, the top-of-descent distance is obtained using the obtained descent and approach phase profiles. This is explained in more detail with reference to FIGS. 3 and 4. Furthermore, the aircraft performance predictions are determined using the obtained descent and approach phase profiles as explained below.

In this embodiment, the aircraft performance predictions for the next time step are computed as shown below. Exemplary aircraft performance predictions includes flight parameters, such as flying altitude, aircraft speed, distance covered by the aircraft 500, time, fuel consumed and the aircraft gross weight. In this embodiment, the altitude of the aircraft 500 for the next time step is computed using equation:

$$\text{ALT}_n = \text{ALT}_{n-1} + \int (dh/dt) dt \qquad (10)$$

wherein, n is a time step (e.g., n=0, 1, 2, . . . );

$\text{ALT}_n$ is an altitude at the nth time step; and $\text{ALT}_{n-1}$ is an altitude at the (n−1)th time step.

Further in this embodiment, the TAS 510 of the aircraft 500 for the next time step is computed as shown below. In the constant CAS descent segment 210, shown in FIG. 2, TAS 510 at the nth time step is obtained using equation:

$$V_{TASn} = V_{TASn-1} + \int (dv/dt) dt$$

wherein, n is a time step (e.g., n=0, 1, 2, ...);

$V_{TASn}$ is a TAS at the nth time step; and $V_{TASn-1}$ is a TAS at the (n−1)th time step.

Also, TAS 510 is computed in the constant CAS descent segment 210 and the constant MACH descent segment 206 for a given altitude, CAS and delta international standard atmosphere (DISA). The altitude is obtained using the equation (10) show above. The CAS of the aircraft 500 is held constant. The DISA is the temperature difference with respect to international standard atmosphere which is obtained by computing a difference between the actual temperature and an ISA temperature. The ISA temperature is computed using equation:

$$ISA_{temperature} = T_0 - 1.98 * [ALT \text{ (feet)}/1000]$$

wherein,

T0 is a temperature at mean sea level.

Further, the MACH number is computed using standard ISA equations and the TAS 510 is computed using the equation:

$$V_{TAS} = M * a$$

wherein,

M is a Mach number; and a is a speed of sound at the flying altitude.

Furthermore in this embodiment, the gross weight for the next time step is obtained using equation:

$$GW_n = GW_{n-1} - \int \text{fuelflowrate} * dt$$

wherein, n is a time step (e.g., n=0, 1, 2 ...);

GWn is a gross weight at nth time step; and

GWn−1 is a gross weight at (n−1)th time step.

In addition, fuel flow rate is computed using engine data stored in the performance database.

Moreover in this embodiment, the distance for the next time step is obtained using equation:

$$DIST_n = DIST_{n-1} + \int VGS * dt$$

wherein, n is a time step (e.g., n=0, 1, 2 ...);

DISTn is a distance at nth time step; and

DISTn−1 is a distance at (n−1)th time step.

In addition, VGS is obtained using the equation:

$$V_{GS} = V_{TAS} + \text{Windspeed}$$

Also, time for the next time step is obtained using equation:

$$TIME_n = TIME_{n-1} + dt$$

wherein, n is a time step (e.g., n=0, 1, 2 ...);

TIMEn is a time at nth time step; and

TIMEn−1 is a time at (n−1)th time step.

The above described computations provide the aircraft performance predictions for each way point in the forward computation. The computations are same for both the backward computation and the forward computation. The aircraft performance predictions thus obtained are presented to the flight crew for information and also to the flight guidance computer for guidance through the descent and approach phases.

Figure 6:
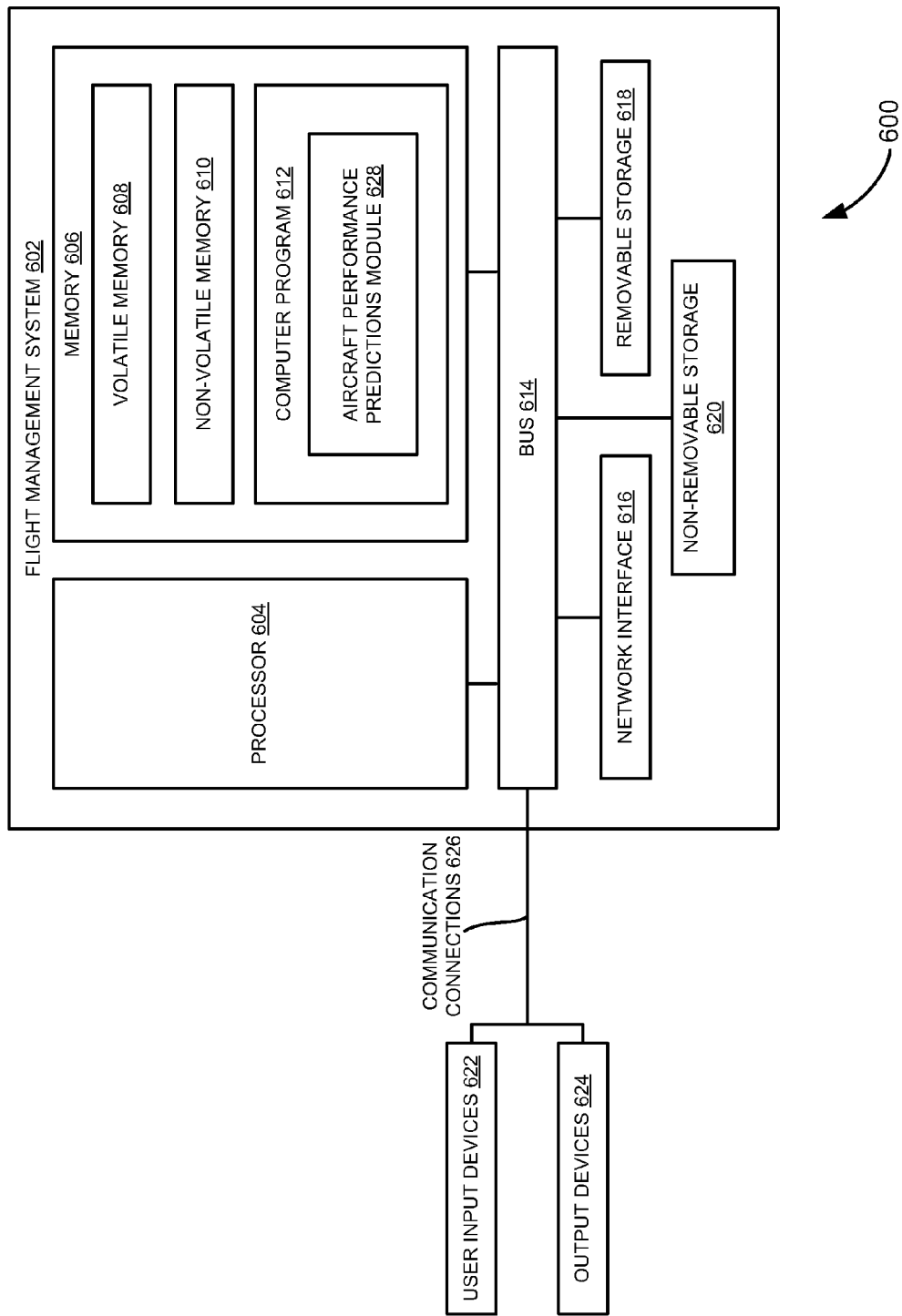
FIG. 6 illustrates the FMS including an aircraft performance predictions module for determining the aircraft performance predictions for the descent and approach phases using the process shown in FIG. 1, according to one embodiment.

Now referring to FIG. 6, which illustrates a FMS 602 including an aircraft performance predictions module 628 for determining the aircraft performance predictions for the descent and approach phases using the process shown in FIG. 1, according to one embodiment. FIG. 6 and the following discussions are intended to provide a brief, general description of a suitable computing environment in which certain embodiments of the inventive concepts contained herein are implemented.

The FMS 602 includes a processor 604, memory 606, a removable storage 618, and a non-removable storage 620. The FMS 602 additionally includes a bus 614 and a network interface 616. As shown in FIG. 6, the FMS 602 includes access to the computing system environment 600 that includes one or more user input devices 622, one or more output devices 624, and one or more communication connections 626 such as a network interface card and/or a universal serial bus connection.

Exemplary user input devices 622 include a digitizer screen, a stylus, trackball, keyboard, keypad, mouse and the like. Exemplary output devices 624 include a display unit of the personal computer, the mobile device, the FMS, and the like. Exemplary communication connections 626 include a local area network, a wide area network, and/or other networks.

The memory 606 further includes volatile memory 608 and non-volatile memory 610. A variety of computer-readable storage media are stored in and accessed from the memory elements of the FMS 602, such as the volatile memory 608 and the non-volatile memory 610, the removable storage 618 and the non-removable storage 620. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 604, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 604 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 604 of the FMS 602. For example, a computer program 612 includes machine-readable instructions capable of providing aircraft performance predictions for descent and approach phase profiles in the FMS 602, according to the teachings and herein described embodiments of the present subject matter. In one embodiment, the computer program 612 is included on a compact disk-read only memory (CD-ROM) and loaded from the CD-ROM to a hard drive in the non-volatile memory 610. The machine-readable instructions cause the FMS 602 to encode according to the various embodiments of the present subject matter.

As shown, the computer program 612 includes an aircraft performance predictions module 628. For example, the aircraft performance predictions module 628 can be in the form of instructions stored on a non-transitory computer-readable storage medium. The non-transitory computer-readable storage medium having the instructions that, when executed by the FMS 602, causes the FMS 602 to perform the one or more methods described in FIGS. 1 through 5.

The systems and methods described herein enables determining the top-of-descent distance by performing an iterative backward computation from the destination to the cruise altitude. The iterative backward computation is performed based on the current predicted aircraft state without making any assumptions with respect to the current predicted aircraft state parameters. Further, the above mentioned embodiments enable determining aircraft performance predictions along the computed flight path without making any simplifying assumptions to the flight path. In addition, the gross weight and the time predictions are computed using a forward computation after determining the top-of-descent distance.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method of aircraft performance predictions for descent and approach phases in a flight management system (FMS), comprising:
    stopping cruise computation substantially around a default distance from a destination by an aircraft performance prediction module residing in a memory of the FMS;
    determining current predicted aircraft state using a total energy of the aircraft starting from the default distance by the aircraft performance predictions module;
    computing descent and approach phase profiles including a flight path using the determined current predicted aircraft state by the aircraft performance prediction module, comprising:
    selecting a starting top of descent distance from the destination while the aircraft is in cruise altitude by the aircraft performance predictions module;
    performing an iterative backward computation from the destination to the cruise altitude by the aircraft performance predictions module to compute the descent and approach phase profiles including the flight path using the determined current predicted aircraft state; and
    obtaining the aircraft performance predictions along the flight path based on the computed descent and approach phase profiles by the aircraft performance predictions module that comprises:
    obtaining a first top of descent distance from the obtained descent and approach profiles;
    determining whether a difference between the starting top of descent distance and the first top of descent distance is within a design value; and
    if so, determining the aircraft performance predictions along the flight path using the descent and the approach phase profiles in a forward computation from the cruise altitude to the destination; and
    if not, considering the first top of descent distance to be the starting top of descent distance; and
    using the considered starting top of descent,
    repeating the steps of performing the iterative backward computation,
    obtaining the first top of descent, and
        determining whether the difference between the starting top of descent distance and the first top of descent distance is within the design value, until the difference is within the design value; and
    guiding the aircraft through the descent and approach phase profiles based on the aircraft performance predictions.

2. The method of claim 1, wherein the current predicted aircraft state includes flight parameters selected from the group consisting of aircraft gross weight, flying altitude, distance covered by the aircraft and aircraft speed.

3. The method of claim 1, wherein the starting top-of-descent distance comprises a point at which the descent phase intercepts the cruise altitude.

4. The method of claim 1, wherein determining the aircraft performance predictions using the descent and approach phase profiles in the forward computation comprises:
    determining the aircraft performance predictions for each way point using the descent and approach phase profiles in the forward computation.

5. An aircraft comprising:
    a flight management system (FMS), wherein the FMS further comprises:
    a processor; and memory coupled to the processor, wherein the memory includes an aircraft performance predictions module having instructions to:
    stop cruise computation substantially around a default distance from a destination;
    determine a current predicted aircraft state using a total energy of the aircraft starting from the default distance;
    compute descent and approach phase profiles including a flight path using the determined current predicted aircraft state, wherein the aircraft performance prediction module further having instructions to:
    select a starting top of descent distance from the destination while the aircraft is in cruise altitude; and
    perform an iterative backward computation from the destination to the cruise altitude to compute the descent and the approach phase profiles including the flight path using the determined current predicted aircraft state; and
    obtain the aircraft performance predictions along the flight path based on the computed descent and approach phase profiles, wherein the aircraft performance predictions module further having instructions to:
    obtain a first top of descent distance from the obtained descent and approach profiles;
    determine whether a difference between the starting top of descent distance and the first top of descent distance is within a design value; and
    if so, determine the aircraft performance predictions along the flight path using the descent and the approach phase profiles in a forward computation from the cruise altitude to the destination:
    if not, consider the first top of descent distance to be the starting top of descent distance; and
    using the considered starting top of descent, repeat the steps of performing the iterative backward computation,
    obtain the first top of descent, and determining whether the difference between the starting top of descent distance and the first top of descent distance is within the design value, until the difference is within the design value; and guide the aircraft through the descent and approach phases based on the aircraft performance predictions.

6. A flight management system (FMS), comprising:
a processor; and a memory coupled to the processor, wherein the memory includes an aircraft performance predictions module having instructions to:
stop cruise computation substantially around a default distance from a destination;
determine current predicted aircraft state using a total energy of the aircraft starting from the default distance;
compute descent and approach phase profiles including a flight path using the determined current predicted aircraft state, wherein the aircraft performance prediction module, further having instructions to:
select a starting top of descent distance from the destination while the aircraft is in cruise altitude; and
perform an iterative backward computation from the destination to the cruise altitude to compute the descent and the approach phase profiles including the flight path using the determined current predicted aircraft state; and
obtain the aircraft performance predictions along the flight path based on the computed descent and approach phase profiles, wherein the aircraft performance predictions module further having instructions to:
obtain a first top of descent distance from the obtained descent and approach profiles;
determine whether a difference between the starting top of descent distance and the first top of descent distance is within a design value; and
if so, determine the aircraft performance predictions along the flight path using the descent and the approach phase profiles in a forward computation from the cruise altitude to the destination:
if not, consider the first top of descent distance to be the starting top of descent distance; and
using the considered starting top of descent, repeat the steps of performing the iterative backward computation, obtain the first top of descent, and
determining whether the difference between the starting top of descent distance and the first top of descent distance is within the design value, until the difference is within the design value; and guide the aircraft through the descent and approach phase profiles based on the aircraft performance predictions.

7. The FMS of claim 6, wherein the current predicted aircraft state includes flight parameters selected from the group consisting of aircraft gross weight, flying altitude and aircraft speed.

8. The FMS of claim 6, wherein the aircraft performance predictions module farther having instructions to:
determine the aircraft performance predictions for each way point using the descent and approach phase profiles in the forward computation.

9. A non transitory computer readable storage medium for aircraft performance predictions for descent and approach phases in a flight management system (FMS), having instructions that, when executed by the FMS, cause the FMS to perform a method comprising:
stopping cruise computation substantially around a default distance from a destination by an aircraft performance prediction module residing in a memory of the FMS;
determining current predicted aircraft state using a total energy of the aircraft starting from the default distance by the aircraft performance predictions module;
computing descent and approach phase profiles including a flight path using the determined current predicted aircraft state by the aircraft performance prediction module, comprising:
selecting a starting top of descent distance from the destination while the aircraft is in cruise altitude; and
performing an iterative backward computation from the destination to the cruise altitude to compute the descent and approach phase profiles including the flight path using the determined current predicted aircraft state; and
obtaining the aircraft performance predictions along the flight path based on the computed descent and approach phase profiles that comprises:
obtaining a first top of descent distance from the obtained descent and approach profiles;
determining whether a difference between the starting top of descent distance and the first top of descent distance is within a design value and
if so, determining the aircraft performance predictions along the flight path using the descent and the approach phase profiles in a forward computation from the cruise altitude to the destination;
if not, considering the first top of descent distance to be the starting top of descent distance; and
using the considered starting top of descent distance, repeating the steps of performing the iterative backward computation,
obtaining the first top of descent distance, and determining whether the difference between starting top of descent distance and the first top of descent distance is within the design value, until the difference is within the design value; and guiding the aircraft through the descent and approach phase profiles based on the aircraft performance predictions.

10. The non-transitoty computer-readable storage medium of claim 9, wherein the current predicted aircraft state includes flight parameters selected from the group consisting of aircraft gross weight, flying altitude and aircraft speed.

11. The non-transitory computer-readable storage medium of claim 9, wherein determining the aircraft performance predictions using the descent and approach phase profiles in the forward computation comprises:
determining the aircraft performance predictions for each way point using the descent and approach phase profiles in the forward computation.

* * * * *